US011887013B2

(12) United States Patent
Kohli et al.

(10) Patent No.: US 11,887,013 B2
(45) Date of Patent: Jan. 30, 2024

(54) SYSTEM AND METHOD FOR FACILITATING MODEL-BASED CLASSIFICATION OF TRANSACTIONS

(71) Applicant: THE BANK OF NEW YORK MELLON, New York, NY (US)

(72) Inventors: Vikas Kohli, Maharashtra (IN); Chetan Agarwal, Maharashtra (IN); Durgesh Chouksey, Maharashtra (IN); Abhay Jayant Joshi, Maharashtra (IN)

(73) Assignee: THE BANK OF NEW YORK MELLON, New York, NY (US)

( * ) Notice: Subject to any disclaimer, the term of this patent is extended or adjusted under 35 U.S.C. 154(b) by 1556 days.

(21) Appl. No.: 16/115,153

(22) Filed: Aug. 28, 2018

(65) Prior Publication Data
US 2019/0080248 A1 Mar. 14, 2019

Related U.S. Application Data

(60) Provisional application No. 62/597,029, filed on Dec. 11, 2017.

(30) Foreign Application Priority Data

Sep. 8, 2017 (IN) .............................. 201711031897

(51) Int. Cl.
G06N 5/025 (2023.01)
G06N 3/08 (2023.01)
(Continued)

(52) U.S. Cl.
CPC ......... G06N 5/025 (2013.01); G06F 16/9024 (2019.01); G06N 3/08 (2013.01); G06Q 40/06 (2013.01)

(58) Field of Classification Search
CPC ................................ G06N 3/08; G06N 5/025
See application file for complete search history.

(56) References Cited

PUBLICATIONS

Krishnan et al, "Extracting decision trees from trained neural networks", 1999, Pattern Recognition, vol. 32, Iss. 12, pp. 1999-2009. (Year: 1999).*

(Continued)

Primary Examiner — Alexey Shmatov
Assistant Examiner — Clint Mullinax
(74) Attorney, Agent, or Firm — Pillsbury Winthrop Shaw Pittman, LLP

(57) ABSTRACT

In certain embodiments, resolved exceptions information regarding resolved exceptions may be obtained. The resolved exceptions information may indicate the resolved exceptions and, for each resolved exception of the resolved exceptions, a set of attributes of a transaction for which the resolved exception was triggered. The resolved exceptions information may be provided as input to a prediction model to obtain multiple decision trees via the prediction model. Each decision tree of the multiple decision trees may comprise nodes and conditional branches, each node of the nodes of the decision tree indicating a probability of a dividend-related classification for a transaction that corresponds to the node. A decision tree may be obtained from the multiple decision trees. Unresolved exception information regarding unresolved exceptions may be processed based on the decision tree to determine which of the decision tree's nodes respectively correspond to transactions for which the unresolved exceptions were triggered.

20 Claims, 4 Drawing Sheets

(51) Int. Cl.
*G06F 16/901* (2019.01)
*G06Q 40/06* (2012.01)

(56) References Cited

PUBLICATIONS

Boz, "Extracting decision trees from trained neural networks", 2002, KDD02: The Eighth ACM SIGKDD International Conference on Knowledge Discovery and Data Mining, pp. 456-461. (Year: 2002).*

Penders, "Identification of Dividend Payments", 2007, Eindhoven University of Technology Department of Mathematics and Computer Science, pp. 1-89. (Year: 2007).*

Krishnan et al, "Extracting decision trees from trained neural networks", 1999, Pattern Recognition, vol. 32, Iss. 12, pp. 1999-2009. (Year: 2009).*

* cited by examiner

SYSTEM AND METHOD FOR FACILITATING MODEL-BASED CLASSIFICATION OF TRANSACTIONS

CROSS-REFERENCE TO RELATED APPLICATIONS

This application claims priority to India Patent Application No. 201711031897 filed Sep. 8, 2017, and also claims the benefits of U.S. Provisional Patent Application No. 62/597,029, filed Dec. 11, 2017. The subject matter of each of the foregoing applications is incorporated herein by reference in entirety.

FIELD OF THE INVENTION

The invention relates to classification of transactions, including, for example, the use of a neural network or other prediction model to assign dividend-related classifications, bond-related classifications, transfer-agency-related classifications, pay-down-related classifications, or other classifications to transactions, to generate narrations related to the transactions, etc.

BACKGROUND OF THE INVENTION

Effective exceptions reconciliation can improve transaction speed, reduce costs and risk, and increase customer satisfaction. Although computer-automated systems for matching transaction details and invoking exceptions exist, such systems fail to facilitate classification and narration of the exceptions in an intelligent and accurate manner. These and other drawbacks exist.

SUMMARY OF THE INVENTION

Aspects of the invention relate to methods, apparatuses, and/or systems for facilitating model-based classification of transactions.

In some embodiments, a neutral network or other prediction model may be utilized for (i) identifying transactions as exceptions, (ii) predicting classifications for the exceptions or transactions (or other items), (iii) generating rules that may be used to predict such exceptions or classifications or to generate narrations related to the exceptions or classifications, (iii) generating a prediction model that may be used to predict such exceptions or classifications or generate such narrations (e.g., where the generated prediction model includes a decision tree, ring, or other graph that incorporates classification rules), or (iv) performing other operations.

In some embodiments, resolved exceptions information may be provided as input to a prediction model, which may generate one or more decision graphs in response to be provided the resolved exceptions information. At least one decision graph (e.g., from the generated decision graphs) may be used to process transaction information (e.g., corresponding to unresolved exceptions) to assign classifications to the transactions (e.g., for which the unresolved exceptions were triggered), to provide narrations of rationales for the classifications, or to perform other operations. The resolved exceptions information may include information indicating 500 or more resolved exceptions, 1000 or more resolved exceptions, 10000 or more resolved exceptions, 100000 or more resolved exceptions, 1000000 or more resolved exceptions, or other number of resolved exceptions. For each of the resolved exceptions, the resolved exceptions information may include information indicating a set of attributes of a transaction that caused the resolved exception, information indicating other circumstances related to the transaction that caused the resolved exception (e.g., corresponding data for the transaction from multiple data sources do not match each other), information indicating the resolution for the resolved exception (e.g., the classification that was assigned to the transaction, the narration provided as a rationale for the classification or other narration provided for the transaction, etc.), or other information.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
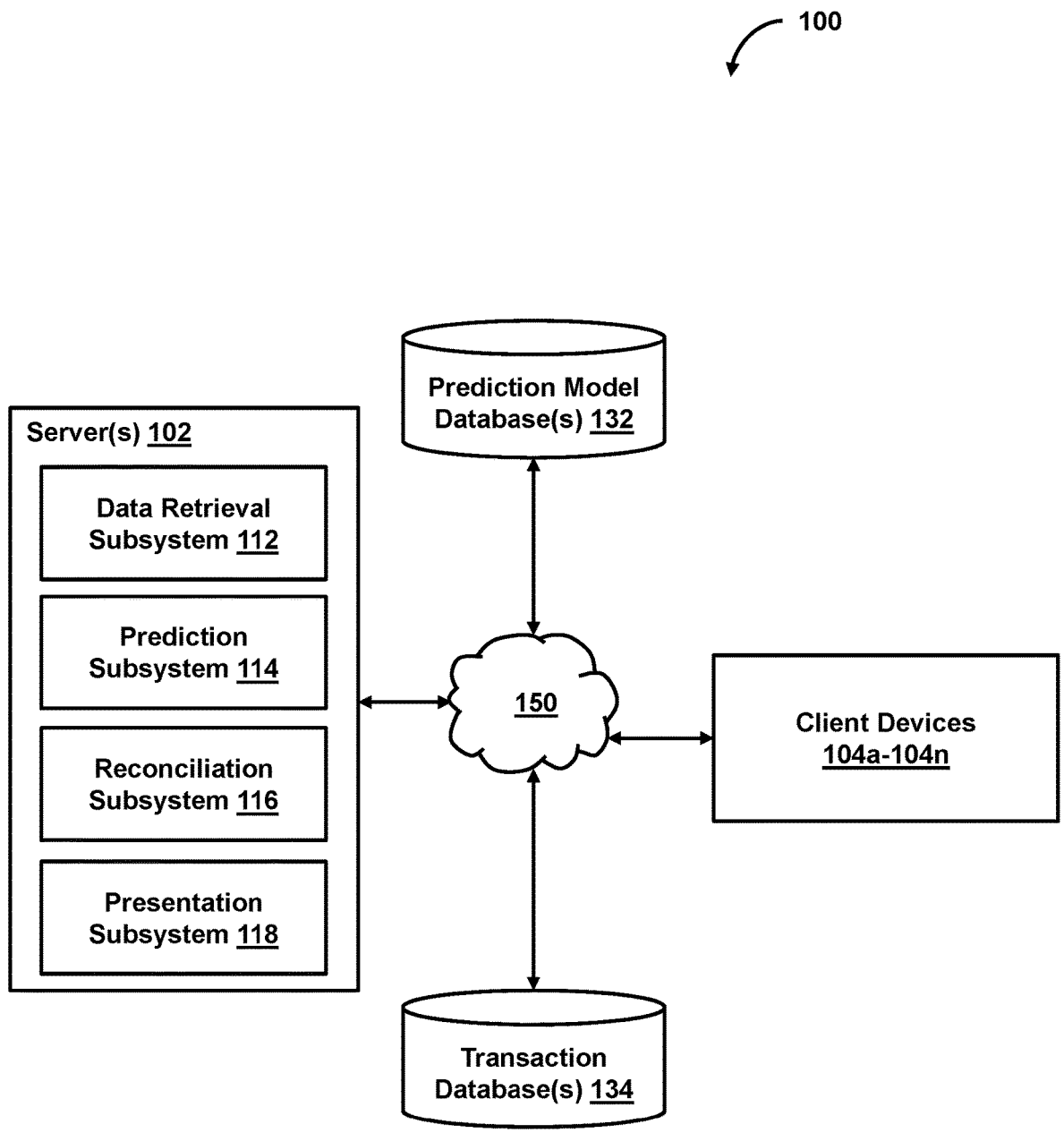
FIG. 1 shows a system for facilitating model-based classification of transactions, in accordance with one or more embodiments.

FIG. 1 shows a system 100 for facilitating model-based classification of transactions, in accordance with one or more embodiments. As shown in FIG. 1, system 100 may include server(s) 102, client devices 104 (or client devices 104a-104n), or other components. Server(s) 102 may include data retrieval subsystem 112, prediction subsystem 114, reconciliation subsystem 116, presentation subsystem 118, or other components. Each client device 104 may include any type of mobile terminal, fixed terminal, or other device. By way of example, client device 104 may include a desktop computer, a notebook computer, a tablet computer, a smartphone, a wearable device, or other client device. In some embodiments, one or more of the foregoing client devices 104 may include one or more sensor devices 106. Users may, for instance, utilize one or more client devices 104 to interact with one another, server(s) 102, or other components of system 100. It should be noted that, while one or more operations are described herein as being performed by particular components of server(s) 102, those operations may, in some embodiments, be performed by other components of system 100. As an example, while one or more operations are described herein as being performed by components of server(s) 102, those operations may, in some embodiments, be performed by components of client device 104.

Model-Based Transaction Classification

In some embodiments, system 100 may use a prediction model to obtain a set of rules that may be used to process transaction information to assign classifications to the transactions (indicated in the transaction information), to generate narrations for the transactions (e.g., indicating the rationale for the assigned classifications or other narrations), or to perform other operations. In some embodiments, a graph representing the set of rules may be obtained, and system 100 may use the graph to process the transaction information to perform the foregoing operations. The graph may include a tree, a ring, or other graph having nodes, edges between the nodes (e.g., edges linking the nodes, edges shared by the nodes, etc.), or other components. Classifications may include dividend-related classifications (e.g., a dividend, not a dividend, etc.), bond-related classifications (e.g., a bond interest, not a bond interest, etc.), transfer-agency-related classifications (e.g., exempt transfer agent transaction, non-exempt transfer agent transaction, etc.), pay-down-related classifications (e.g., loan payoff, loan pay down, non-pay-down, etc.), or other classifications. It should be noted that, while one or more operations in some embodiments described herein involve dividend-related classifications, other classifications may be used in lieu of or in addition to dividend-related classifications in other embodiments.

In some embodiments, system 100 may obtain "training" transaction information (e.g., resolved exceptions information, unresolved exceptions information, or other transaction information) and use a prediction model to process the transaction information to obtain one or more decision graphs (e.g., which may also represent one or more prediction models). In some embodiments, system 100 may use at least one of the decision graphs to process other transaction information to identify transactions as exceptions, classify the exceptions or transactions, generate narrations for the exceptions or transactions, etc. A decision graph may include one or more root nodes, lead nodes, internal nodes (e.g., non-root and non-leaf nodes), etc. In one use case, a root node of the decision graph may correspond to a set of observations of at least some of the transaction information (e.g., 100% of all transactions indicated by the transaction information, only some of all transactions indicated by the transaction information, etc.). Additionally, or alternatively, internal nodes or leaf nodes of the decision graph may individually correspond to respective percentages of the set of observations. In another use case, root nodes, internal nodes, or leaf nodes may individually indicate (i) respective probabilities of certain classifications (e.g., for a transaction that corresponds to a respective node), (ii) respective percentages, of the set of observations, that correspond to the nodes, or (iii) other aspects. The prediction model used to generate the prediction model may be a neural network or other prediction model (e.g., machine-learning-based prediction model or other prediction model).

In some embodiments, a neutral network may be trained and utilized for (i) identifying transactions as exceptions, (ii) predicting classifications for the exceptions or transactions (or other items), (iii) generating rules that may be used to predict such exceptions or classifications or to generate narrations related to the exceptions or classifications, (iii) generating a prediction model that may be used to predict such exceptions or classifications or generate such narrations (e.g., where the generated prediction model includes a decision tree, ring, or other graph that incorporates classification rules), or (iv) performing other operations. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neutral unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

In some embodiments, data retrieval subsystem 112 may obtain resolved exceptions information regarding resolved transactions (e.g., from transaction database(s) 134 or other sources). Prediction subsystem 114 may process the resolved exceptions information to obtain one or more decision graphs. In some embodiments, prediction subsystem 114 may use a prediction model to process the resolved exception information to obtain the decision graphs. At least one decision graph (e.g., from the obtained decision graphs) may be used to process transaction information (e.g., corresponding to unresolved exceptions) to assign classifications to the transactions (e.g., for which the unresolved exceptions were triggered), to provide narrations of rationales for the classifications, or to perform other operations. As an example, the resolved exceptions information may be provided as input to the prediction model, which may generate the decision graphs in response to be provided the resolved exceptions information. The resolved exceptions information may include information indicating 500 or more resolved exceptions, 1000 or more resolved exceptions, 10000 or more resolved exceptions, 100000 or more resolved exceptions, 1000000 or more resolved exceptions, or other number of resolved exceptions. For each of the resolved exceptions, the resolved exceptions information may include information indicating a set of attributes of a transaction that caused the resolved exception, information indicating other circumstances related to the transaction that caused the resolved exception (e.g., corresponding data for the transaction from multiple data sources do not match each other), information indicating the resolution for the resolved exception (e.g., the classification that was assigned to the transaction, the narration provided as a rationale for the classification or other narration provided for the transaction, etc.), or other information. Unresolved exception information may include information indicating 500 or more unresolved exceptions, 1000 or more unresolved exceptions, 10000 or more unresolved exceptions, 100000 or more unresolved exceptions, 1000000 or more unresolved exceptions, or other number of unresolved exceptions. For each of the unresolved exceptions, the unresolved exceptions information may include information indicating a set of attributes of a transaction that caused the unresolved exception, information indicating other circumstances related to the transaction that caused the unresolved exception (e.g., corresponding data for the transaction from multiple data sources do not match each other), or other information.

In some embodiments, a decision graph obtained via a prediction model (e.g., from the processing of resolved exceptions information via the prediction model) may include a decision tree having nodes, conditional branches, or other components. In some embodiments, the decision tree has a root node that corresponds to a set of observations (e.g., of at least some of the resolved exceptions information), nodes that each indicate (i) a probability of a classification for a transaction that corresponds to the node, (ii) a percentage, of the set of observations, that corresponds to the node, or (iii) other information. A classification may include a dividend-related classification (e.g., a dividend, not a dividend, etc.), bond-related classification (e.g., a bond interest, not a bond interest, etc.), transfer-agency-related classification (e.g., exempt transfer agent transaction, non-exempt transfer agent transaction, etc.), pay-down-related classification (e.g., loan payoff, loan pay down, non-paydown, etc.), or other classification. As an example, with respect to FIG. 2, decision graph 200 is a binary decision tree that includes nodes 201, 202, 203, 206, 207, 212, 213, 224, 225, 250, 251, other nodes (not shown for convenience) and conditional branches. Root node 201 indicates that, if a transaction's attributes do not satisfy either of the conditional branches of root node 201 (e.g., thereby, remaining at root node 201), the transaction is to be assigned a "Non-Dividend" classification. Root node 201 also indicates that the probability of such a transaction (which remains at root node 201) being qualified as a dividend is 5% and the probability of such a transaction not being qualified as a dividend is 95%. Root node 201 further indicates that it corresponds to 100% of a set of observations (e.g., where the set of observations may include all transactions indicated by the transaction information, only some of all transactions indicated by the transaction information, etc.). As an example, Table 1 below shows the indications provided by nodes of decision graph 200.

TABLE 1

| Node | Probability of Transaction Being Qualified as a Dividend | Probability of Transaction Not Being Qualified as a Dividend | Percentage of the Set of Observations to Which Root Node Corresponds |
|---|---|---|---|
| Node 201 | 5% | 95% | 100% |
| Node 202 | 98% | 2% | 4% |
| Node 203 | 2% | 98% | 96% |
| Node 206 | 45% | 55% | 4% |
| Node 207 | 0% | 100% | 92% |
| Node 212 | 88% | 12% | 2% |
| Node 213 | 10% | 90% | 2% |
| Node 224 | 97% | 3% | 1% |
| Node 225 | 71% | 29% | 1% |
| Node 250 | 100% | 0% | 0% |
| Node 251 | 0% | 100% | 0% |

As another example, the following pseudocode may represent the process in which decision tree 200 (of FIG. 2) or other decision trees may be obtained.

```
// Initialize data
    ExceptionData= initialize breaks data
    CustodyData = initialize custody data
// Map the two data sources
    Data = MAP ExceptionData to CustodyData on
        ExceptionData.Ref1 == CustodyData.RefNumber
// Standardize the column Ref2
    Step 4: Data.Ref2_Class = LookupTable(Ref2)
// Build the machine learning model, where MLModel is a set of decision trees
    MLModel = randomForest(Data.ExceptionType ~
        Data.Item_Reason + Data.Entry_Type + Data.Currency +
        Data.Class2 + Data.Ref2_1 + other Data.Ref[X_Y],
        importance=T, proximity=T, ntree=500)
// Extract rules from the ML model (e.g., at least one tree is selected from the decision tree set)
    Rules = ExtractRules(MLModel)
// Save rules
    Save(Rules)
```

As yet another example, the following pseudocode may represent the process in which decision tree 200 (of FIG. 2) or other decision tree may be obtained.

```
// Initialize data
    BOData = initialize breaks data
    CustodyData = initialize custody data
// Map the two data sources
    Data = MAP BOData to CustodyData on BOData.Ref1 == CustodyData.RefNumber
// Standardize columns
    Ref1_1= gsub(Ref1) //Remove digits and punctuations, standardize the column Ref1
    Ref2_1= gsub(Ref2) //Remove digits and punctuations, standardize the column Ref2
    Ref3_1= gsub(Ref3) //Remove digits and punctuations, standardize the column Ref3
    Ref4_1= gsub(Ref4) //Remove digits and punctuations, standardize the column Ref4
// Build the machine learning model, where MLModel is a set of decision trees
    MLModel = randomForest(Data.ExceptionType ~ Data.Item_Reason + Data.Entry_Type +
        Data.Currency + Data.Class2 + Data.Ref1_1 + Data.Ref2_1 + Data.Ref3_1 +
        Data.Ref4_1, importance=T, proximity=T, ntree=500)
// Classify: Use at least one decision tree of the set of decision trees to predict the exception type
    Exception Type Prediction= predict(MLModel,data)
// Identify Probability/Confidence
    Probability <- predict(MLmodel, data,type = "prob")
```

In some embodiments, prediction subsystem 114 may process resolved exceptions information to obtain multiple decision graphs. In some embodiments, prediction subsystem 114 may use a prediction model to process the resolved exception information to obtain the multiple decision graphs. Prediction subsystem 114 may select (or otherwise obtain) at least one decision graph from the multiple decision graphs. In some embodiments, data retrieval subsystem 112 may obtain other transaction information (e.g., from transaction database(s) 134 or other sources), and reconciliation subsystem 116 may process the other transaction information based on a selected decision graph to identify transaction as exceptions, classify the exceptions or transactions, generate narrations for the exceptions or transactions, etc. In some embodiments, reconciliation subsystem 116 may use two or more of the multiple decision graphs 306 to process the other transaction information (e.g., to avoid overfitting of their respective training sets). For each exception or transaction, reconciliation subsystem 116 may output a classification that is the mode of the classes or mean prediction of the individual decision graphs 306 (that are used to process the other transaction information) for exception or transaction. Additionally, or alternatively, reconciliation subsystem 116 may provide narration for the classification by combining or more of the narrations generated via the individual decision graphs 306 (e.g., combining narrations generated via some or all of the individual decision graphs, identifying and remove repetitive narrations, etc.)

Figure 3:
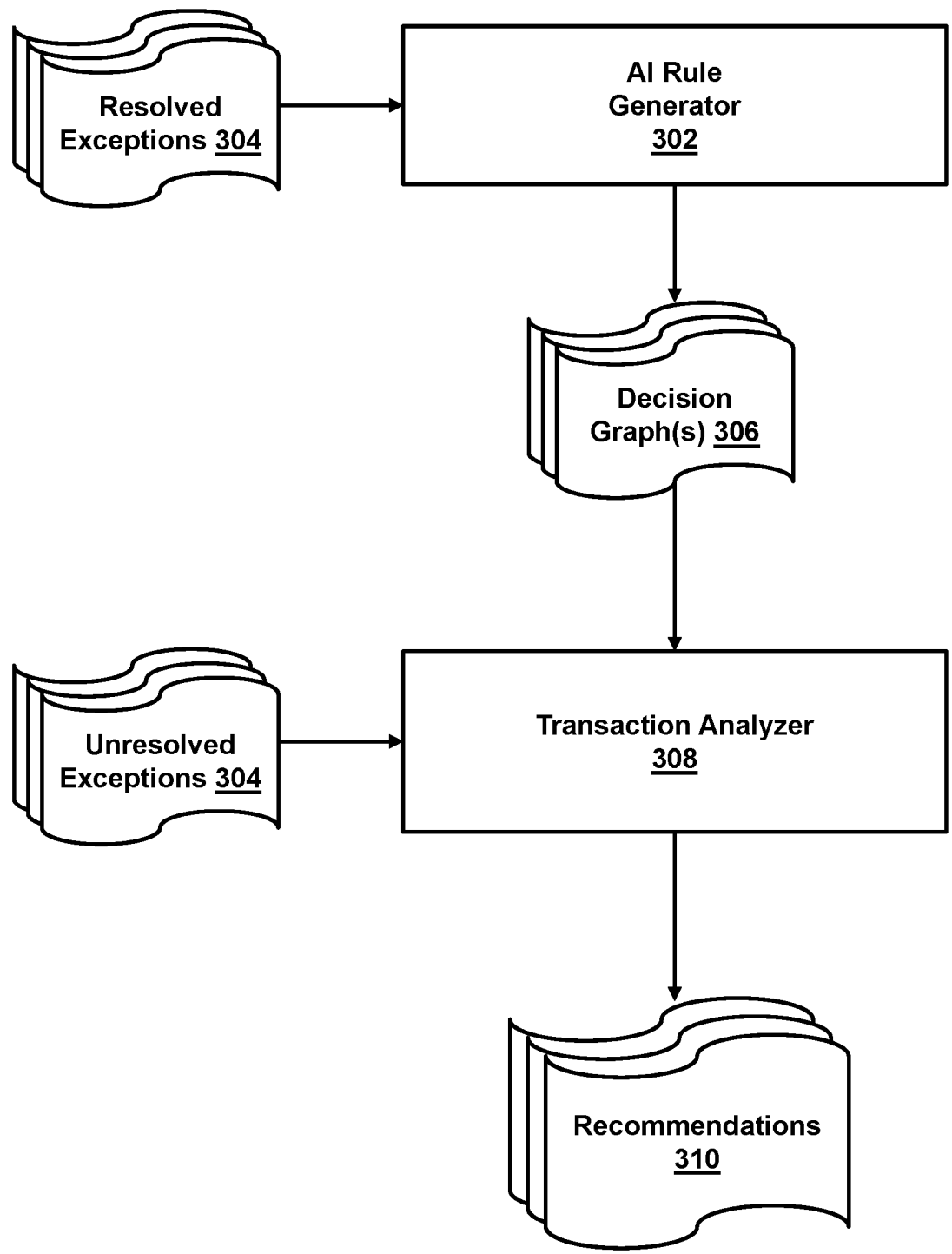
FIG. 3 shows a system for generating decision trees and use of selected decision tree(s) to process transaction information, in accordance with one or more embodiments.

As an example, with respect to FIG. 3, artificial-intelligence-based (AI) rule generator 302 may take as input resolved exceptions 304 and process resolved exceptions 304 to generate multiple decision graphs 306. At least one of the multiple decision graphs 306 may be provided to transaction analyzer 308. Transaction analyzer 308 may use a selected decision graph 306 (or selected decision graphs 306) to process unresolved exceptions 304 and generate one or more recommendations 310. The generated recommendations 310 may include classifications for the exceptions or transactions (to which the exceptions correspond), narrations regarding rationale for the classifications, or other recommendations. As another example, transaction analyzer 308 may automatically assigned its classifications to the exceptions or transactions (e.g., without requiring further related user input subsequent to being provided the selected decision graph and unresolved exceptions) or assign the classifications to the exceptions or transactions upon user confirmation of the assignment. As a further example, transaction analyzer 308 may automatically generate the narrations for the classifications (e.g., without requiring further related user input subsequent to being provided the selected decision graph and unresolved exceptions). Presentation subsystem 118 may cause the recommendations, the assignments, the narrations, or other information to be presented on a user interface for presentation to a user.

In some embodiments, prediction subsystem 114 may analyze accuracy of each decision graph of a set of decision graphs (e.g., obtained via a prediction model), and select one or more decision graphs (from the set of decision graphs) to be used to identify transaction as exceptions, classify the exceptions or transactions, generate narrations for the exceptions or transactions, etc. As an example, a decision graph may be selected based on the analysis indicating that the accuracy of the decision graph is greater than or equal to one or more other decision graphs (e.g., more accuracy than all other decision graphs of the set of decision graphs). In some embodiments, prediction subsystem 114 may analyze accuracy of the decision graphs based on the probabilities of classifications indicated by nodes of the decision graphs, the percentages of a set of observations that respectively correspond to the nodes, or other criteria. As an example, for each of the decision graphs, the accuracy for the decision graph may be based on its nodes' respective probabilities and percentages. In one use case, the accuracy for the decision graph may be based on its internal nodes' (i) probabilities of classifications (e.g., dividend-related classifications or other classifications) for transactions that respectively correspond to the internal nodes and (ii) percentages, of the set of observations, that respectively correspond to the internal nodes. In a further use case, the accuracy for the decision graph may be based on its root node(s)' (i) probabilities of classifications (e.g., dividend-related classifications or other classifications) for transactions that respectively correspond to the root node(s) and (ii) percentages, of the set of observations, that respectively correspond to the root node(s).

In some embodiments, prediction subsystem 114 may use each decision graph (of a set of decision graphs obtained via a prediction model's processing of resolved exception information) may be used to predict classifications (e.g., dividend-related classifications or other classifications) for at least some transactions of the same resolved exceptions information or other resolved exceptions information. For each of the decision graphs, prediction subsystem 114 may compare the decision graph's predicted classifications with corresponding classifications indicated by the same resolved exceptions information or the other resolved exceptions information. As an example, if all of the decision graph's predicted classifications for the transactions are exactly the same as the same resolved exceptions information's classifications assigned to those transactions, then prediction subsystem 114 may determine that the decision tree's accuracy is very high (e.g., 100% accuracy or other accuracy determination). As such, in some embodiments, prediction subsystem 114 may analyze the accuracy of each of the decision tree based on the foregoing comparison.

In some embodiments, reconciliation subsystem 116 may generate narrations for one or more transactions, exceptions resulting from the transactions, classifications for the exceptions or transactions, or other aspects. In some embodiments, with respect to a decision graph (on which processing of transaction information is based), reconciliation subsystem 116 may traverse from one or more nodes of the decision graph and generate narration for a transaction, an exception (resulting from the transaction), or a classification for the transaction based on the traversal of the nodes (e.g., which nodes are traversed, which edges/branches of the nodes are traversed, etc.). In some embodiments, reconciliation subsystem 116 may traverse from a first node of the decision graph to a second node of the decision graph based on which conditional branches of the decision graph's root node and internal nodes are satisfied by the transaction's attributes. The first node may be a root node of the decision graph, a first internal node of the decision graph, or another node of the decision graph, where the second node is a different node of the decision graph from the first node. In one use case, the first node is a root node of the decision graph, and the second node is a leaf node of the decision graph. In another use case, the first node is an internal node of the decision graph, and the second node is different internal node of the decision graph. In some reconciliation subsystem 116 may generate narration for the transaction, exception, or classification based on the conditional branches traversed during the traversal from the first node of the decision graph to the second node of the decision graph.

Figure 2:
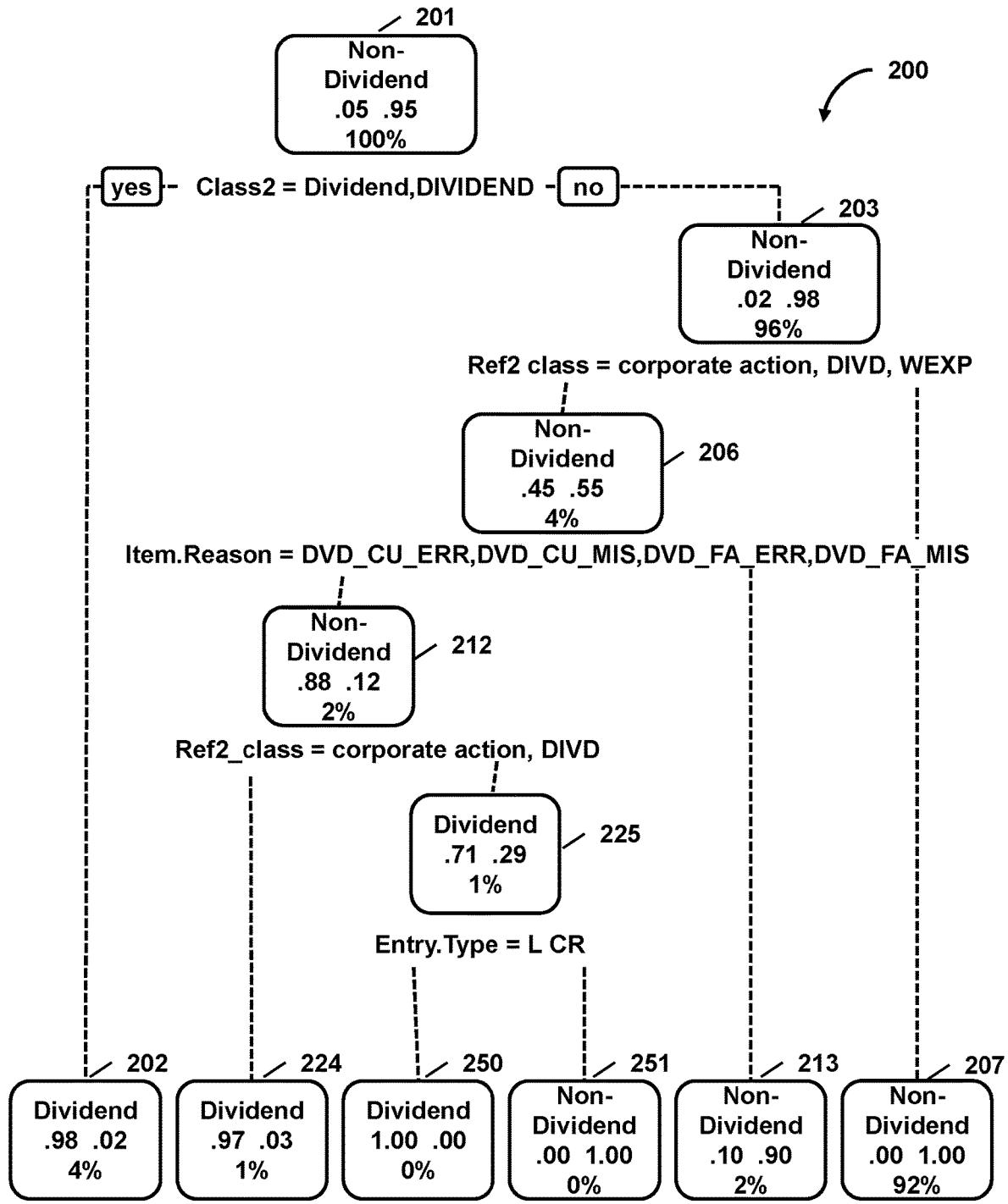
FIG. 2 show a decision graph obtained from a set of prediction-model-generated decision graphs, in accordance with one or more embodiments.

As an example, with respect to FIG. 2, information for a transaction may be processed by traversing from root node 201 of the decision tree 200 to at least one of the leaf nodes of the decision tree 200. Starting from root node 201, if the transaction's "Class2" attribute indicates a dividend, then the left condition branch ("Yes" or other indicator) is used to traverse from root node 201 directly to leaf node 202; otherwise, the right condition branch ("No" or other indicator) is used to traverse from root node 201 to internal node 203. From internal node 203, if the transaction's "Ref2_class" attribute is equal to "corporate_action," "DIVD," or "WEXP," then the left condition branch ("Yes" or other indicator) is used to traverse from internal node 203 to internal node 206; otherwise, the right condition branch ("No" or other indicator) is used to traverse from internal node 203 to node 207; and so on. In one use case, if the traversal ends at leaf node 202, the generated narration may include an indication that "Class2" attribute equals "dividend." In another use case, if the traversal ends at node 207 (and node 207 is a leaf node), the generated narration may include an indication that the "Class2" attribute does not equal "dividend," and an indication that the "Ref2_class" attribute does not equal "corporate_action," "DIVD," or "WEXP."

As another example, the following pseudocode may represent the process in which narration may be generated.

```
//Apply CONDITION and generate_Dividend_Narration_Condition
    Function generate_Dividend_Narration_Condition(Bo_data)
        CALL Only_Ledger_DVD_and_WEXP_narration with Bo_data
        CALL Only_Ledger_DVD_narration with Bo_data
        CALL Only_Ledger_WEXP_narration with Bo_data
        CALL Single_Custody_narration with Bo_data
        CALL Custody_Reversal_narration with Bo_data
        CALL Accounting_and_Custody_with_Same_Currency_narration with Bo_data
        CALL Accounting_and_Custody_with_Different_Currency_narration with Bo_data
        END generate_Dividend_Narration_Condition
```

As yet another example, the following pseudocode may represent the process in which narration may be generated.

```
// Only_Ledger_DVD_and_WEXP_narration
Function Only_Ledger_DVD_and_WEXP_narration(Bo_data)
Initialize Filtered_Only_Ledger_DVD_and_WEXP_data =Filter Bo_data where
        dividendcomment is equal to 'Only Ledger DVD & WEXP'
For each Exception in Filtered_Only_Ledger_DVD_and_WEXP_data
IF    (AccGross_Txtgross_Compare of Exception is Equal to "#NA" or
        AccWexp_TxtWexp_Compare of Exception is Equal to "#NA")
CRT_Comments of Exception="CHECK - DVD posted at Accounting, sec – [ISIN] of
        the Exception , ex dt -" + ["Ex_Date"] of the Exception ,PD- " + ["Pay_Date"] of
        the Exception, Shares - ["Shares"] of the Exception ,Per Accounting, Rate –
        "Accounting rate of the Exception" & WEXP rate " + LedgerWEXP of The
        Exception + ", Per BB rate is- " + TXT_Rate of the Exception + ", WEXP Rate -" +
        TXT Tax Rate for the Exception + " ,TXT rate not updated in TXT"
ELSE  IF  (AccGross_Txtgross_Compare of Exception is Equal to "True" and
        AccWexp_TxtWexp_Compare of Exception is Equal to "False")
CRT_Comments of Exception="DVD posted at Accounting, sec – [ISIN] of the
        Exception, ex dt -" + ["Ex_Date"] of the Exception ,PD- " + ["Pay_Date"] of the
        Exception, Shares - ["Shares"] of the Exception ,Per Accounting, Rate –
        "Accounting rate of the Exception" & WEXP rate " + LedgerWEXP of The
        Exception + ", Per BB rate is- " + TXT_Rate of the Exception + " , WEXP Rate -" +
        TXT Tax Rate for the Exception + " ,WEXP not ties to TXT, awaiting Custody
        posting"
ELSE IF (AccGross_Txtgross_Compare of Exception is Equal to "False" and
        AccWexp_TxtWexp_Compare of Exception is Equal to "true")
CRT_Comments of Exception=" DVD posted at Accounting, sec – [ISIN] of the
        Exception, ex dt -" + ["Ex_Date"] of the Exception ,PD- " + ["Pay_Date"] of the
        Exception, Shares - ["Shares"] of the Exception ,Per Accounting, Rate –
        "Accounting rate of the Exception" & WEXP rate " + LedgerWEXP of The
        Exception + ", Per BB rate is- " + TXT_Rate of the Exception + ", WEXP Rate -"
        + TXT Tax Rate for the Exception + " ,Rate not ties to TXT, awaiting Custody
        posting"
ELSE IF(AccGross_Txtgross_Compare of Exception is Equal to "False" and
        AccWexp_TxtWexp_Compare of Exception is Equal to "False")
CRT_Comments of Exception="CHECK - DVD posted at Accounting, sec – [ISIN] of
        the Exception , ex dt -" + ["Ex_Date"] of the Exception ,PD- " + ["Pay_Date"] of
        the Exception, Shares - ["Shares"] of the Exception ,Per Accounting, Rate –
        "Accounting rate of the Exception" & WEXP rate " + LedgerWEXP of The
        Exception + ", Per BB rate is- " + TXT_Rate of the Exception + ", WEXP Rate -"
        + TXT Tax Rate for the Exception + " ,Rate not ties to BB, WEXP not ties to
        TXT, awaiting Custody posting"
ELSE IF(AccGross_Txtgross_Compare of Exception is Equal to "True" and
        AccWexp_TxtWexp_Compare of Exception is Equal to "True")
```

```
CRT_Comments of Exception="CHECK - DVD posted at Accounting, sec – [ISIN] of
    the Exception , ex dt –" + ["Ex_Date"] of the Exception ,PD- " + ["Pay_Date"] of
    the Exception, Shares - ["Shares"] of the Exception ,Per Accounting, Rate –
    "Accounting rate of the Exception" & WEXP rate " + LedgerWEXP of The
    Exception + ", Per BB rate is- " + TXT_Rate of the Exception + " , WEXP Rate -"
    + TXT Tax Rate for the Exception + " ,posting ties to TXT, awaiting Custody
    posting"
END IF
END For
END Only_Ledger_DVD_and_WEXP_narration
```

Example Flowchart

Figure 4:
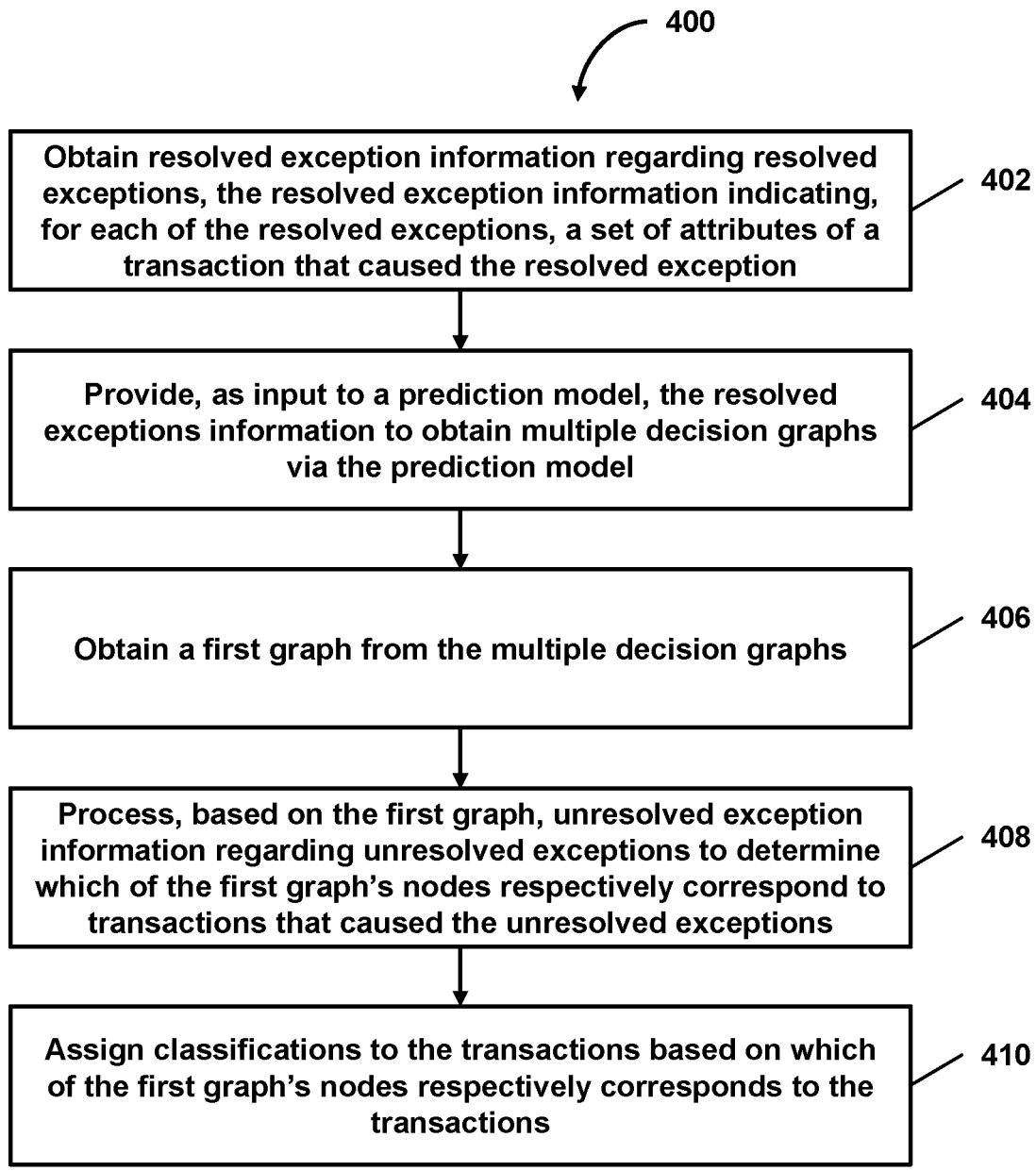
FIG. 4 shows a flowchart of a method of facilitating model-based classification of transactions, in accordance with one or more embodiments.

FIG. 4 shows a flowchart of a method 500 of facilitating model-based classification of transactions, in accordance with one or more embodiments. The processing operations of the method presented below are intended to be illustrative and non-limiting. In some embodiments, for example, the method may be accomplished with one or more additional operations not described, and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the method in response to instructions stored electronically on an electronic storage medium. The processing devices may include one or more devices configured through hardware, firmware, and/or software to be specifically designed for execution of one or more of the operations of the method.

In an operation 402, resolved exceptions information regarding resolved exceptions may be obtained. As an example, the resolved exceptions information may include (i) information indicating the resolved exceptions (e.g., exception identifiers, identifier of transactions for which exceptions were triggered, etc.), (ii) information indicating sets of attributes of transactions that respectively triggered the resolved exceptions, (iii) information indicating other circumstances related to the transactions that triggered the unresolved exception (e.g., corresponding data for the transactions from multiple data sources do not match each other), or (iv) other information. In one use case, a transaction's set of attributes may include currency, reference (e.g., Ref1, Ref2, Ref3, Ref4, etc.), class (e.g., Class2), entry type, item reason, or other attributes. Operation 402 may be performed by a subsystem that is the same as or similar to data retrieval subsystem 112, in accordance with one or more embodiments.

In an operation 404, the resolved exceptions information may be provided as input to a prediction model to obtain multiple decision graphs via the prediction model. As an example, each decision graph (of the multiple decision graphs) may include nodes and edges between the nodes. Each decision graph may include one or more root nodes, lead nodes, internal nodes (e.g., non-root and non-leaf nodes), etc. In one use case, each decision graph may include a tree, a ring, or other graph. In another use case, a root node of each decision graph may correspond to a set of observations of at least some of the resolved exceptions information. Additionally, or alternatively, internal nodes or leaf nodes of the decision graph may individually correspond to respective percentages of the set of observations. In another use case, root nodes, internal nodes, or leaf nodes may individually indicate (i) respective probabilities of dividend-related classifications or other classifications (e.g., for a transaction that corresponds to a respective node), (ii) respective percentages, of the set of observations, that correspond to the nodes, or (iii) other aspects. Operation 404 may be performed by a subsystem that is the same as or similar to prediction subsystem 114, in accordance with one or more embodiments.

In an operation 406, a first decision graph may be obtained from the multiple decision graphs. As an example, the first decision may be derived from the multiple decision graphs. In one use case, the first decision graph may be derived by combining portions of two or more of the multiple decision graphs to generate the first decision graph, averaging probabilities of two or more matching nodes of two or more of the multiple decision graphs to compute a probability for a given node of the first decision graph, or deriving the first decision graph in other ways. As another example, the first decision graph may be selected from among the multiple decision graphs. In one scenario, the first decision graph may be selected based on a determination that the accuracy of the first decision graph is greater than or equal to all other decision graphs of the multiple decision graphs. The accuracy of the first decision graph may be determined based on one or more techniques described herein or based on other techniques. Operation 406 may be performed by a subsystem that is the same as or similar to prediction subsystem 114, in accordance with one or more embodiments.

In an operation 408, unresolved exception information regarding unresolved exceptions may be processed based on the first decision graph to determine which of the first decision graph's nodes respectively correspond to transactions for which the unresolved exceptions were triggered. Operation 408 may be performed by a subsystem that is the same as or similar to reconciliation subsystem 116, in accordance with one or more embodiments.

In an operation 410, classifications may be assigned to the transactions based on which of the first decision graph's nodes respectively correspond to the transactions. As an example, a first transaction may be assigned a first classification based on the first transaction being determined to correspond to a first leaf node. As a further example, the first transaction may be assigned the first classification further based on the first leaf node indicating a greater probability of the first transaction being classified into the first classification, as compared to a probability of the first transaction being classified into one or more other classifications. In one use case, if the first classification is "Dividend" (as opposed to "Non-Dividend"), the first transaction may be assigned as a "Dividend" based on (i) the first transaction being determined to correspond to the first leaf node and (ii) the first leaf node indicating a greater probability of the first transaction being qualified as a dividend, as compared to another probability of the first transaction not being qualified as a dividend. Operation 410 may be performed by a subsystem that is the same as or similar to reconciliation subsystem 116, in accordance with one or more embodiments.

In some embodiments, the various computers and subsystems illustrated in FIG. 1 may include one or more computing devices that are programmed to perform the functions described herein. The computing devices may include one or more electronic storages (e.g., prediction model database(s) 132, transaction database(s) 134, or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118 or other subsystems. The processors may be programmed to execute computer program instructions by software; hardware; firmware; some combination of software, hardware, or firmware; and/ or other mechanisms for configuring processing capabilities on the processors.

It should be appreciated that the description of the functionality provided by the different subsystems 112-118 described herein is for illustrative purposes, and is not intended to be limiting, as any of subsystems 112-118 may provide more or less functionality than is described. For example, one or more of subsystems 112-118 may be eliminated, and some or all of its functionality may be provided by other ones of subsystems 112-118. As another example, additional subsystems may be programmed to perform some or all of the functionality attributed herein to one of subsystems 112-118.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining resolved exceptions information regarding resolved exceptions, the resolved exceptions information indicating the resolved exceptions and, for each resolved exception of the resolved exceptions, a set of attributes of a transaction for which the resolved exception was triggered; providing, as input to a prediction model, the resolved exceptions information to obtain multiple decision trees via the prediction model, each decision tree of the multiple decision trees comprising nodes and conditional branches, each node of the nodes of the decision tree indicating a probability of a dividend-related classification for a transaction that corresponds to the node; obtaining a first decision tree from the multiple decision trees obtained via the prediction model; processing, based on the first decision tree, unresolved exception information regarding unresolved exceptions to determine which of the first decision tree's nodes respectively correspond to transactions for which the unresolved exceptions were triggered; and assigning dividend-related classifications to the transactions based on which of the first decision tree's nodes respectively correspond to the transactions, a first transaction being assigned a first dividend-related classification based on the first transaction being determined to correspond to a first node.

2. The method of embodiment 1, further comprising, for each transaction of the transactions: generating narration for the transaction based on the first decision tree.

3. The method of embodiments 1 or 2, further comprising, for each transaction of the transactions: traversing from a root node of the first decision tree to a node of the decision tree based on which conditional branches of the first decision tree's root node and internal nodes are satisfied by the transaction's attributes; and generating narration for the transaction based on the conditional branches traversed during the traversal from the root node to the node.

4. The method of any of embodiments 1-3, further comprising: analyzing accuracy of each decision tree of the multiple decision trees; and obtaining the first decision tree from the multiple decision trees by selecting the first decision tree from among the multiple decision trees based on the analysis indicating that the accuracy of the first decision tree is greater than or equal to one or more other decision trees of the multiple decision trees.
5. The method of embodiment 4, further comprising: analyzing the accuracy of each decision tree of the multiple decision trees based on, for each decision tree of the multiple decision trees, its nodes' (i) probabilities of dividend-related classifications for transactions that respectively correspond to the nodes and (ii) percentages, of the set of observations, that respectively correspond to the nodes.
6. The method of embodiment 4, further comprising: using each decision tree of the multiple decision trees to predict dividend-related classifications for at least some transactions of the resolved exceptions information or other resolved exceptions information; and analyzing the accuracy of each decision tree of the multiple decision trees based on a comparison of the decision tree's predicted dividend-related classifications and corresponding dividend-related classifications of the resolved exceptions information or the other resolved exceptions information.
7. The method of any of embodiments 1-6, wherein the first transaction is assigned a classification, which indicates that the first transaction qualifies as a dividend, based on (i) the first transaction being determined to correspond to the first node and (ii) the first node indicating a greater probability of being qualified as a dividend than not being qualified as a dividend.
8. A method comprising: obtaining resolved exceptions information regarding at least 1000 resolved exceptions, the resolved exceptions information indicating the 1000 resolved exceptions and, for each resolved exception of the 1000 resolved exceptions, a set of attributes of a transaction for which the resolved exception was triggered; providing, as input to a neural network, the resolved exceptions information to obtain multiple decision trees via the neural network, each decision tree of the multiple decision trees (a) comprising nodes and conditional branches and (b) having a root node that corresponds to a set of observations of at least some of the resolved exceptions information, each leaf node of the nodes of the decision tree indicating (i) a probability of a dividend-related classification for a transaction that corresponds to the leaf node and (ii) a percentage, of the set of observations, that corresponds to the leaf node; obtaining a first decision tree from the multiple decision trees obtained via the neural network; processing, based on the first decision tree, unresolved exception information regarding unresolved exceptions to determine which of the first decision tree's leaf nodes respectively correspond to transactions for which the unresolved exceptions were triggered; and assigning dividend-related classifications to the transactions based on which of the first decision tree's leaf nodes respectively correspond to the transactions, a first transaction being assigned a first dividend-related classification based on the first transaction being determined to correspond to a first leaf node.
9. The method of embodiment 8, further comprising, for each transaction of the transactions: generating narration for the transaction based on the first decision tree.
10. The method of embodiments 8 or 9, further comprising, for each transaction of the transactions: traversing from a root node of the first decision tree to a node of the decision tree based on which conditional branches of the first decision tree's root node and internal nodes are satisfied by the transaction's attributes; and generating narration for the transaction based on the conditional branches traversed during the traversal from the root node to the node.
11. The method of any of embodiments 8-10, further comprising: analyzing accuracy of each decision tree of the multiple decision trees; and obtaining the first decision tree from the multiple decision trees by selecting the first decision tree from among the multiple decision trees based on the analysis indicating that the accuracy of the first decision tree is greater than or equal to one or more other decision trees of the multiple decision trees.
12. The method of embodiment 11, further comprising: analyzing the accuracy of each decision tree of the multiple decision trees based on, for each decision tree of the multiple decision trees, its nodes' (i) probabilities of dividend-related classifications for transactions that respectively correspond to the nodes and (ii) percentages, of the set of observations, that respectively correspond to the nodes.
13. The method of embodiment 11, further comprising: using each decision tree of the multiple decision trees to predict dividend-related classifications for at least some transactions of the resolved exceptions information or other resolved exceptions information; and analyzing the accuracy of each decision tree of the multiple decision trees based on a comparison of the decision tree's predicted dividend-related classifications and corresponding dividend-related classifications of the resolved exceptions information or the other resolved exceptions information.
14. The method of any of embodiments 8-13, wherein the first transaction is assigned a classification, which indicates that the first transaction qualifies as a dividend, based on (i) the first transaction being determined to correspond to the first node and (ii) the first node indicating a greater probability of being qualified as a dividend than not being qualified as a dividend.
15. A tangible, non-transitory, machine-readable medium storing instructions that when executed by a data processing apparatus cause the data processing apparatus to perform operations comprising those of any of embodiments 1-14.
16. A system, comprising: one or more processors; and memory storing instructions that when executed by the processors cause the processors to effectuate operations comprising those of any of embodiments 1-14.

What is claimed is:
1. A system for facilitating model-based dividend classification of transactions, the system comprising:
a computer system that comprises one or more processors programmed with computer program instructions that, when executed, cause the computer system to:
obtain resolved exceptions information regarding at least 1000 resolved exceptions, the resolved exceptions information indicating the 1000 resolved exceptions and, for each resolved exception of the 1000 resolved exceptions, a set of attributes of a transaction for which the resolved exception was triggered;
provide, as input to a neural network, the resolved exceptions information to obtain multiple decision trees via the neural network, each decision tree of the multiple decision trees (a) comprising nodes and conditional branches and (b) having a root node that corresponds to a set of observations of at least some of the resolved exceptions information, each leaf node of the nodes of the decision tree indicating (i) a probability of a dividend related classification for a transaction that corresponds to the leaf node and (ii) a percentage, of the set of observations, that corresponds to the leaf node;

wherein the neural network comprises multiple layers of neural units, and wherein a signal path traverses from front layers to back layers of the multiple layers, to obtain each decision tree;

obtain a first decision tree from the multiple decision trees obtained via the neural network;

process, based on the first decision tree, unresolved exception information regarding unresolved exceptions to determine which of the first decision tree's leaf nodes respectively correspond to transactions for which the unresolved exceptions were triggered; and assign dividend-related classifications to the transactions based on which of the first decision tree's leaf nodes respectively correspond to the transactions, a first transaction being assigned a first dividend-related classification based on the first transaction being determined to correspond to a first leaf node.

2. The system of claim 1, wherein the computer system is further caused to, for each transaction of the transactions, generate a narration for the transaction based on the first decision tree.

3. The system of claim 1, wherein the computer system is further caused to, for each transaction of the transactions:

traverse from a root node of the first decision tree to a leaf node of the decision tree based on which conditional branches of the first decision tree's root node and internal nodes are satisfied by the transaction's attributes; and generate a narration for the transaction based on the conditional branches traversed during the traversal from the root node to the leaf node.

4. The system of claim 1, wherein the computer system is further caused to:

analyze accuracy of each decision tree of the multiple decision trees; and obtain the first decision tree from the multiple decision trees by selecting the first decision tree from among the multiple decision trees based on the analysis indicating that the accuracy of the first decision tree is greater than or equal to one or more other decision trees of the multiple decision trees.

5. The system of claim 4, wherein the computer system is further caused to:

analyze the accuracy of each decision tree of the multiple decision trees based on, for each decision tree of the multiple decision trees, its internal nodes' (i) probabilities of dividend-related classifications for transactions that respectively correspond to the internal nodes and (ii) percentages, of the set of observations, that respectively correspond to the internal nodes.

6. The system of claim 4, wherein the computer system is further caused to:

use each decision tree of the multiple decision trees to predict dividend-related classifications for at least some transactions of the resolved exceptions information or other resolved exceptions information; and analyze the accuracy of each decision tree of the multiple decision trees based on a comparison of the decision tree's predicted dividend-related classifications and corresponding dividend-related classifications of the resolved exceptions information or the other resolved exceptions information.

7. The system of claim 1, wherein the first transaction is assigned a classification, which indicates that the first transaction qualifies as a dividend, based on (i) the first transaction being determined to correspond to the first leaf node and (ii) the first leaf node indicating a greater probability of being qualified as a dividend than not being qualified as a dividend.

8. A method of facilitating model-based dividend classification of transactions, the method being implemented by a computer system comprising one or more processors executing computer program instructions that, when executed, perform the method, the method comprising:

obtaining resolved exceptions information regarding resolved exceptions, the resolved exceptions information indicating the resolved exceptions and, for each resolved exception of the resolved exceptions, a set of attributes of a transaction for which the resolved exception was triggered;

providing, as input to a prediction model, the resolved exceptions information to obtain multiple decision trees via the prediction model, each decision tree of the multiple decision trees comprising nodes and conditional branches, each node of the nodes of the decision tree indicating a probability of a dividend-related classification for a transaction that corresponds to the node;

wherein the neural network comprises multiple layers of neural units, and wherein a signal path traverses from front layers to back layers of the multiple layers, to obtain each decision tree;

obtaining a first decision tree from the multiple decision trees obtained via the prediction model;

processing, based on the first decision tree, unresolved exception information regarding unresolved exceptions to determine which of the first decision tree's nodes respectively correspond to transactions for which the unresolved exceptions were triggered; and assigning dividend-related classifications to the transactions based on which of the first decision tree's nodes respectively correspond to the transactions, a first transaction being assigned a first dividend-related classification based on the first transaction being determined to correspond to a first node.

9. The method of claim 8, further comprising, for each transaction of the transactions: generating a narration for the transaction based on the first decision tree.

10. The method of claim 8, further comprising, for each transaction of the transactions:

traversing from a root node of the first decision tree to a node of the decision tree based on which conditional branches of the first decision tree's root node and internal nodes are satisfied by the transaction's attributes; and generating a narration for the transaction based on the conditional branches traversed during the traversal from the root node to the node.

11. The method of claim 8, further comprising:

analyzing accuracy of each decision tree of the multiple decision trees; and obtaining the first decision tree from the multiple decision trees by selecting the first decision tree from among the multiple decision trees based on the analysis indicating that the accuracy of the first decision tree is greater than or equal to one or more other decision trees of the multiple decision trees.

12. The method of claim 10, further comprising:
analyzing the accuracy of each decision tree of the multiple decision trees based on, for each decision tree of the multiple decision trees, its nodes' (i) probabilities of dividend-related classifications for transactions that respectively correspond to the nodes and (ii) percentages, of the set of observations, that respectively correspond to the nodes.

13. The method of claim 10, further comprising:
using each decision tree of the multiple decision trees to predict dividend-related classifications for at least some transactions of the resolved exceptions information or other resolved exceptions information; and
analyzing the accuracy of each decision tree of the multiple decision trees based on a comparison of the decision tree's predicted dividend-related classifications and corresponding dividend-related classifications of the resolved exceptions information or the other resolved exceptions information.

14. The method of claim 8, wherein the first transaction is assigned a classification, which indicates that the first transaction qualifies as a dividend, based on (i) the first transaction being determined to correspond to the first node and (ii) the first node indicating a greater probability of being qualified as a dividend than not being qualified as a dividend.

15. A system for facilitating model-based dividend classification of transactions, the system comprising:
a computer system that comprises one or more processors programmed with computer program instructions that, when executed, cause the computer system to:
obtain resolved exceptions information regarding resolved exceptions, the resolved exceptions information indicating the resolved exceptions and, for each resolved exception of the resolved exceptions, a set of attributes of a transaction for which the resolved exception was triggered;
provide, as input to a prediction model, the resolved exceptions information to obtain multiple decision trees via the prediction model,
each decision tree of the multiple decision trees comprising nodes and conditional branches, each node of the nodes of the decision tree indicating a probability of a dividend-related classification for a transaction that corresponds to the node;
wherein the neural network comprises multiple layers of neural units, and wherein a signal path traverses from front layers to back layers of the multiple layers, to obtain each decision tree;
obtain a first decision tree from the multiple decision trees obtained via the prediction model;
process, based on the first decision tree, unresolved exception information regarding unresolved exceptions to determine which of the first decision tree's nodes respectively correspond to transactions for which the unresolved exceptions were triggered; and
assign dividend-related classifications to the transactions based on which of the first decision tree's nodes respectively correspond to the transactions, a first transaction being assigned a first dividend-related classification based on the first transaction being determined to correspond to a first node.

16. The system of claim 15, wherein the computer system is further caused to, for each transaction of the transactions:
traverse from a root node of the first decision tree to a node of the decision tree based on which conditional branches of the first decision tree's root node and internal nodes are satisfied by the transaction's attributes; and
generate a narration for the transaction based on the conditional branches traversed during the traversal from the root node to the node.

17. The system of claim 15, wherein the computer system is further caused to:
analyze accuracy of each decision tree of the multiple decision trees; and
obtain the first decision tree from the multiple decision trees by selecting the first decision tree from among the multiple decision trees based on the analysis indicating that the accuracy of the first decision tree is greater than or equal to one or more other decision trees of the multiple decision trees.

18. The system of claim 17, wherein the computer system is further caused to:
analyze the accuracy of each decision tree of the multiple decision trees based on, for each decision tree of the multiple decision trees, its nodes' (i) probabilities of dividend-related classifications for transactions that respectively correspond to the nodes and (ii) percentages, of the set of observations, that respectively correspond to the nodes.

19. The system of claim 17, wherein the computer system is further caused to:
use each decision tree of the multiple decision trees to predict dividend-related classifications for at least some transactions of the resolved exceptions information or other resolved exceptions information; and
analyze the accuracy of each decision tree of the multiple decision trees based on a comparison of the decision tree's predicted dividend-related classifications and corresponding dividend-related classifications of the resolved exceptions information or the other resolved exceptions information.

20. The system of claim 15, wherein the first transaction is assigned a classification, which indicates that the first transaction qualifies as a dividend, based on (i) the first transaction being determined to correspond to the first node and (ii) the first node indicating a greater probability of being qualified as a dividend than not being qualified as a dividend.

* * * * *